United States Patent [19]

Becker

[11] 4,003,202

[45] Jan. 18, 1977

[54] VARIABLE FEEDBACK STEERING SYSTEM

[75] Inventor: Lanson Becker, Galesburg, Mich.

[73] Assignee: General Signal Corporation, Rochester, N.Y.

[22] Filed: Mar. 11, 1976

[21] Appl. No.: 665,824

[52] U.S. Cl. ............................... 60/385; 91/358 R
[51] Int. Cl.² ....................................... F15B 13/12
[58] Field of Search ............ 60/385, 386, 393, 388; 180/132, 133, 134, 141, 152; 91/358 R, 368

[56] References Cited

UNITED STATES PATENTS

| 3,016,708 | 1/1962 | Gordon et al. | 60/388 X |
| 3,584,537 | 6/1971 | Schulz | 180/152 X |

*Primary Examiner*—Edgar W. Geoghegan
*Attorney, Agent, or Firm*—Harold Huberfeld; Jeffrey S. Mednick

[57] ABSTRACT

A hydraulic control circuit for the steering system of an articulated vehicle is provided having a first pump means for delivering fluid under pressure and directional control valve means in fluid communication with the first pump means for controlling the direction of flow of the pressurized fluid. A second pump means, responsive to a steering input signal, develops an output indicative of a desired change in vehicle direction. An actuator means is connected to the directional control valve means for controlling the position of the directional control valve means, and said actuator means is in fluid communication with the second pump means so as to receive the output therefrom. A feedback means is placed in fluid communication with the actuator means for developing a feedback signal to counteract the effect of the second pump output, and a means is placed in fluid communication with the feedback means for varying the feedback signal to thereby vary the rate of counteracting the second pump output.

8 Claims, 3 Drawing Figures

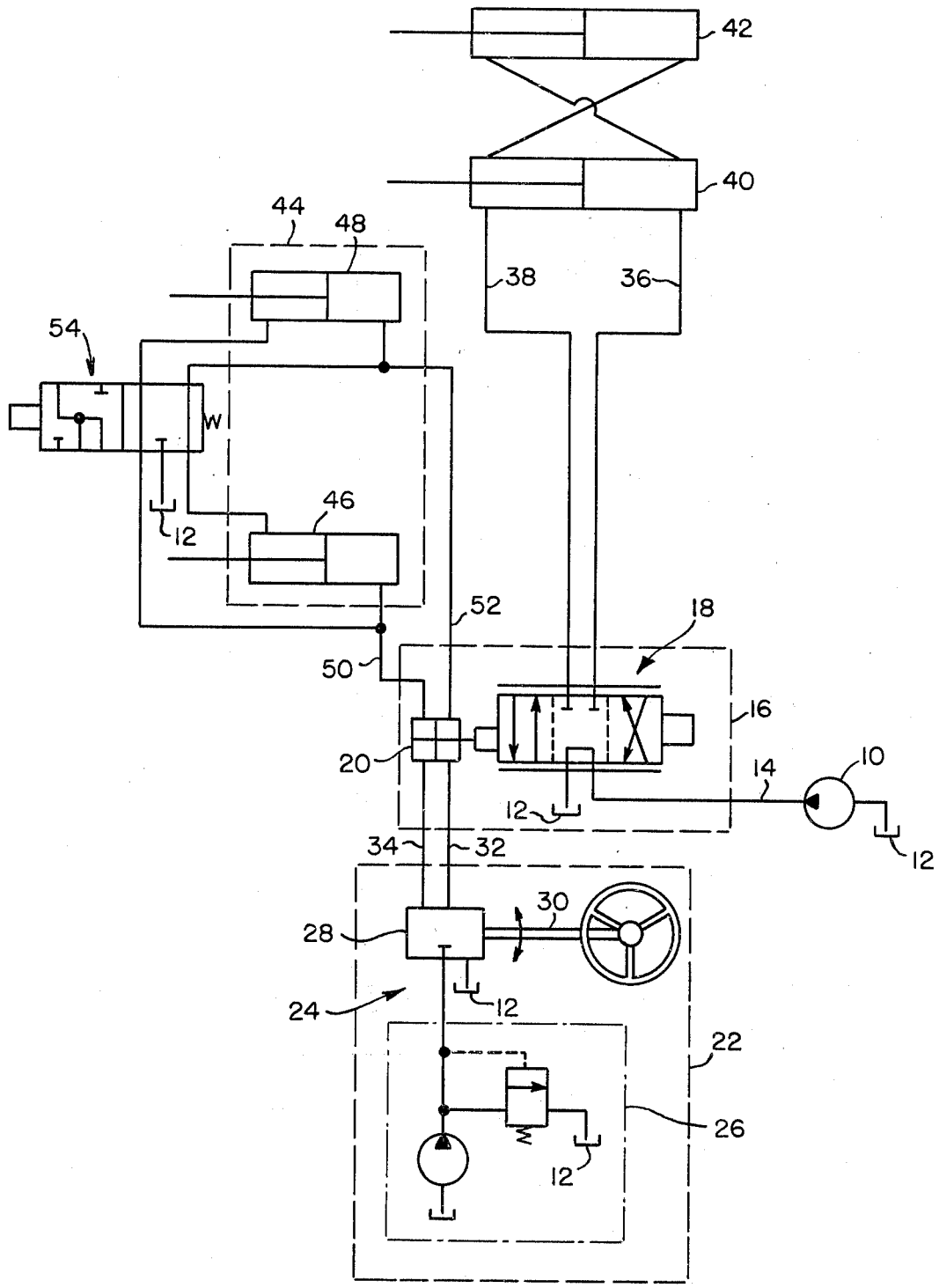

VARIABLE FEEDBACK STEERING SYSTEM

BACKGROUND OF THE INVENTION

The present invention relates generally to a hydraulic control circuit having a variable feedback path and more particularly to a hydraulic control circuit for the steering system of an articulated vehicle to provide variable steering for that vehicle.

It is well known that certain articulated vehicles utilized in construction, mining, and logging require relatively fast or responsive steering for certain operations and require relatively slow or unresponsive steering at other times. For example, logskidders require fast steering on the job to enable the vehicle to "duck walk" or assist the tractive effort of the skidder to pull it out of axle-deep mud. On the road, however, where the vehicle may be operated at higher travel speeds, fast or responsive steering can be dangerous, and therefore is undesirable. Thus, for road travel, it is desirable to have slow or relatively unresponsive steering. This problem has been solved heretofore by the use of complex mechanical linkages to provide multi-rate steering; by the use of plural pump systems; by the use of an accumulator to back up the normal pump pressure for increased responsiveness; and by the use of flow divider valves to vary steering rates. All of these systems have been relatively complex in nature.

SUMMARY OF THE INVENTION

Accordingly, a novel hydraulic control circuit for the steering system of an articulated vehicle has been provided which includes a first pump means for delivering fluid under pressure and directional control valve means in fluid communication with the first pump means for controlling the direction of flow of the pressurized fluid. A second pump means, responsive to a steering input signal, develops an output indicative of a desired change in vehicle direction. An actuator means is connected to the directional control valve means for controlling the position of the directional control valve means, and said actuator is in fluid communication with the second pump means so as to receive the output therefrom. A feedback means is placed in fluid communication with the actuator means for developing a feedback signal to counteract the effect of the second pump output, and a means is placed in fluid communication with the feedback means for varying the feedback signal to thereby vary the rate of counteracting the second pump output.

Thus, an object of the present invention is the provision of a hydraulic control circuit for the steering system of an articulated vehicle which will permit the responsiveness of the steering to be varied from relatively fast to relatively slow.

Another object of the present invention is the provision of a hydraulic control circuit for the steering system of an articulated vehicle which will maintain carefully metered flow regardless of the responsiveness of the steering.

A further object of the present invention is the provision of a hydraulic control circuit for the steering system of an articulated vehicle which may be easily adapted to existing steering systems to convert them to a system having steering of variable responsiveness.

Still another object of the present invention is the provision of a hydraulic control system for the steering system of an articulated vehicle which is both inexpensive and easy to manufacture.

Other objects, advantages, and novel features of the present invention will become apparent from the following detailed description of the invention when considered in conjunction with the accompanying drawing.

BRIEF DESCRIPTION OF THE DRAWING

The drawing shows a preferred embodiment of the hydraulic control circuit of the present invention in graphic form.

BRIEF DESCRIPTION OF THE PREFERRED EMBODIMENT

Referring now to the only FIGURE, a hydraulic control circuit is provided having a source of pressurized fluid 10. The source of pressurized fluid is preferably a fixed displacement pump which draws fluid from a reservoir 12 and delivers it to an output line 14. The output line 14 is in fluid communication with a means 16 for apportioning the pressurized fluid between a plurality of paths. The apportioning means 16 includes a directional control valve 18 in fluid communication with the pump 10 for controlling the direction of flow of the pressurized fluid. The apportioning means 16 further includes an actuator means 20 connected to the directional control valve 18 for controlling the position of the directional control valve. The actuator means 20 is preferably a double end rod piston actuator to yield symmetry of operation.

An input means 22 is placed in fluid communication with the apportioning means 16 for changing the apportioning of the pressurized fluid. The input means 22 includes a second pump means 24, responsive to a steering input signal, for developing an output indicative of a desired change in vehicle direction. The second pump means includes a fixed displacement charge pump system 26 for maintaining fluid under pressure and delivering the fluid to a hand pump 28. The hand pump 28 is preferably connected to a steering input shaft 30 and consists of a rotary device for metering an amount of fluid delivered by the pump system 26 in accordance with the degree of rotation of shaft 30. The hand pump 28 is placed in fluid communication with the actuator 20 by means of lines 32 and 34. Thus, in response to rotation of the steering input shaft 30 the hand pump 28 will meter fluid either along line 32 or line 34, depending upon the direction of rotation of shaft 30, to actuator 20.

The directional control valve 18 is connected by means of lines 36 and 38 to a steering drive cylinder 40. The cylinder 40 is, in turn, connected, head end to rod end and rod end to head end, to a second steering drive cylinder 42. The drive cylinders 40 and 42 are mounted between the units of an articulated vehicle to steer the vehicle in a known manner.

A feedback means 44 is placed in fluid communication with the apportioning means for developing a feedback signal to counteract the effect of the input means. The feedback means 44 consists of cylinder means, such as the feedback cylinders 46 and 48, mounted on the articulated vehicle in such a manner as to be responsive to the position of the vehicle and the drive cylinders 40 and 42. The feedback cylinders 46 and 48 are connected to the actuator 20 by lines 50 and 52 respectively.

The elements of the system described thus far are old and form no part of the present invention. What is new is a means 54 in fluid communication with the feedback means 44 for varying the feedback signal to thereby vary the rate of counteracting the input signal. Normally, the feedback cylinders 46 and 48 might have permanent connections between the head and rod ends of the respective cylinders as shown. Thus the feedback signal along lines 50 and 52 would have a fixed degree of responsiveness. However, according to the present invention a second directional control valve 54 is provided to, for example, place the head end of cylinder 46 in fluid communication with the rod end of cylinder 48 and the rod end of cylinder 46 in fluid communication with the head end of cylinder 48 in a first valve position; and to place the rod ends of cylinders 46 and 48 in fluid communication with reservoir 12 in a second position. This is only one manner in which the feedback cylinders 46 and 48 may be connected and other alternatives will become apparent from the following discussion of the operation of the hydraulic control circuit of the present invention.

Assuming that the directional control valve 18 starts in a neutral position, as shown, all fluid pumped from the pump 10 will be returned to tank 12 and there will be no change in the position of the drive cylinders 40 and 42 and thus the attitude of the vehicle. Should the operator turn the steering shaft 30 in a given direction, the hand pump 28 will meter an amount of fluid proportional to the rotation of shaft 30 into, for example, line 34. As a result, fluid will be pumped into the left chamber of piston actuator 20, driving the piston and the control spool of valve 18 to the right a corresponding amount. As the valve spool moves off its neutral position, fluid from line 14 will now be permitted to flow into line 36 and into the head end of cylinder 40 and the rod end of cylinder 42. Thus the vehicle will begin to turn.

If, for example, the feedback cylinder 46 corresponds to drive cylinder 40 and the feedback cylinder 48 corresponds to drive cylinder 42, the piston of cylinder 46 will be moved to the left and the piston of cylinder 48 will be moved to the right, as a result of vehicle movement. Accordingly, if the directional control valve 54 is in the first position, as illustrated, fluid from the head end of cylinder 48 and fluid from the rod end of cylinder 46 will be pumped into the right hand chamber of piston actuator 20. Additionally, fluid from the left side of piston actuator 20 will be permitted to escape through line 50 to the head end of cylinder 46 and the rod end of cylinder 48. Thus, the piston in actuator 20 will be moved to the left, counteracting the input signal from hand pump 28 and the valve 18 will again be moved to its neutral position cutting off any flow to the cylinders 40 and 42, and thus preventing any further change in attitude of the vehicle. Consequently, in this first position, a relatively large feedback signal is provided which in turn makes the responsiveness of the steering relatively slow. Such an arrangement would be suitable for high speed operation of the vehicle.

However, for low speed operation of the vehicle where highly responsive steering is required, the valve 54 may be placed in a second position. The valve 54 may be so shifted either manually, or automatically through a mechanical connection to the vehicle transmission. In any case, if the valve 54 is shifted to the right, as a result of an identical steering input the feedback signal will be altered considerably. In the second position only the head end of feedback cylinder 48 will be delivering fluid through line 52 to the right side of piston actuator 20. Additionally, only the head end of feedback cylinder 46 will be available to receive fluid from the left side of actuator 20. As a result, the spool of valve 18 would not be returned to its neutral position as quickly as in the first example, and the steering would be more responsive. In the example illustrated, the steering in the second case might be nearly twice as responsive as the steering in the first case. However, this ratio can be easily varied first of all by changing the volumetric ratios between cylinder head and rod ends. Additionally, although only two feedback cylinders have been illustrated, there is no limit to the number of feedback cylinders that may be utilized and, accordingly, a wide range of steering responsiveness could easily be achieved. Furthermore, while the valve 54 is illustrated as a two position valve, it could in fact have additional positions, enabling the operator to have the choice of several degrees of steering responsiveness if so desired. Of course, should the steering input shaft 30 be turned in a second direction, the spool of valve 18 would be moved to the left and the system would work in an identical but opposite manner.

Thus, a hydraulic control circuit for the steering system of an articulated vehicle has been provided which will easily enable the operator to achieve a high degree of steering responsiveness at low vehicle speeds and a low degree of steering responsiveness at high vehicle speeds. Since the system changes only the feedback signal and does not alter the mode of operation of the primary hydraulic circuit, the metering characteristics of control valve 18 remain unaffected by the change in steering responsiveness. Additionally, since only a directional control valve and a few extra lines need be added to existing steering systems, the present system may be easily adapted to systems presently in use. Furthermore, this ease of adaptation will enable the present invention to be easily and inexpensively manufactured.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A hydraulic control circuit comprising:
   a. a source of pressurized fluid;
   b. means for apportioning said pressurized fluid between a plurality of paths;
   c. input means in fluid communication with said apportioning means for changing the apportioning of said pressurized fluid;
   d. feedback means in fluid communication with said apportioning means for developing a feedback signal to counteract the effect of said input means; and
   e. means in fluid communication with said feedback means for varying said feedback signal to thereby vary the rate of counteracting said input signal.

2. A hydraulic control circuit as set forth in claim 1 wherein said feedback means comprises cylinder means, wherein aid means for varying sid feedback signal comprises a multiposition directional control valve, and wherein said valve places the head and rod ends of said cylinder means in fluid communication in a first manner when in a first position and places the head and rod ends of said cylinder means in fluid communication in a second manner when in a second position.

3. A hydraulic control circuit as set forth in claim 2, wherein said cylinder means comprises first and second cylinders and wherein in said first position said valve places the head end of said first cylinder and the rod end of said second cylinder in fluid communication and places the head end of said second cylinder and the rod end of said first cylinder in fluid communication, and wherein in said second position said valve places the rod ends of said first and second cylinders in fluid communication with a reservoir.

4. A hydraulic control circuit as set forth in claim 1, wherein said apportioning means is connected to a load and wherein said feedback means is responsive to the position of said load.

5. A hydraulic control circuit for the steering system of an articulated vehicle comprising:
  a. first pump means for delivering fluid under pressure;
  b. first directional control valve means in fluid communication with said first pump means for controlling the direction of flow of said pressurized fluid;
  c. second pump means, responsive to a steering input signal, for developing an output indicative of a desired change in vehicle direction;
  d. actuator means connected to said first directional control valve means for controlling the position of said first directional control valve means, said actuator means being in fluid communication with said second pump means to receive said output therefrom;
  e. feedback means in fluid communication with said actuator means for developing a feedback signal to counteract the effect of said second pump means output; and
  f. means in fluid communication with said feedback means for varying said feedback signal to thereby vary the rate of counteracting said second pump means output.

6. A hydraulic control circuit as set forth in claim 5, wherein said first directional control valve means is in fluid communication with a plurality of drive cylinders and wherein said feedback means is responsive to the position of said drive cylinders.

7. A hydraulic control circuit as set forth in claim 5 wherein said feedback means comprises a cylinder means, wherein said means for varying said feedback signal comprises second directional control valve means, and wherein said second valve means places the head and rod ends of said cylinder means in fluid communication in a first manner when in a first position and places the head and rod ends of said cylinder means in fluid communication in a second manner when in a second position.

8. A hydraulic control circuit as set forth in claim 7, wherein said cylinder means comprises first and second cylinders and wherein in said first position said valve places the head end of said first cylinder and the rod end of said second cylinder in fluid communication and places the head end of said second cylinder and the rod end of said first cylinder in fluid communication, and wherein in said second position said valve places the rod ends of said first and second cylinders in fluid communication with a reservoir.

* * * * *